United States Patent
Gupta et al.

(10) Patent No.: US 10,529,033 B2
(45) Date of Patent: Jan. 7, 2020

(54) NETWORK CONNECTION SYSTEM AND METHOD

(71) Applicant: Clarifize, Inc., Saint Paul, MN (US)

(72) Inventors: Diwakar Gupta, Saint Paul, MN (US); Michael Heldebrant, Apple Valley, MN (US); John Bergstrom, Saint Paul, MN (US)

(73) Assignee: Clarifize, Inc, Saint Paul, MN (US)

( * ) Notice: Subject to any disclaimer, the term of this patent is extended or adjusted under 35 U.S.C. 154(b) by 205 days.

(21) Appl. No.: 15/345,270

(22) Filed: Nov. 7, 2016

(65) Prior Publication Data
US 2017/0132255 A1 May 11, 2017

Related U.S. Application Data

(60) Provisional application No. 62/251,778, filed on Nov. 6, 2015.

(51) Int. Cl.
*G06Q 50/00* (2012.01)
*G06F 16/9535* (2019.01)
*G06Q 30/02* (2012.01)

(52) U.S. Cl.
CPC ......... *G06Q 50/01* (2013.01); *G06F 16/9535* (2019.01); *G06Q 30/02* (2013.01); *G06Q 30/0244* (2013.01); *G06Q 30/0277* (2013.01)

(58) Field of Classification Search
CPC ...... G06Q 50/01; G06Q 30/02; G06Q 30/244; G06Q 30/277; G06F 17/30867; G06F 16/9535
See application file for complete search history.

(56) References Cited

U.S. PATENT DOCUMENTS

| | | | |
|---|---|---|---|
| 7,069,308 B2* | 6/2006 | Abrams | G06Q 10/10 705/319 |
| 8,954,503 B2 | 2/2015 | Bosworth et al. | |
| 9,252,961 B2 | 2/2016 | Bosworth et al. | |
| 2001/0044795 A1* | 11/2001 | Cohen | G06F 17/30699 |
| 2003/0037034 A1* | 2/2003 | Daniels | G06Q 10/087 |
| 2005/0055357 A1* | 3/2005 | Campbell | G06F 8/61 |
| 2006/0085373 A1* | 4/2006 | Dhillon | G06Q 30/02 |

(Continued)

*Primary Examiner* — Jay A Morrison
(74) *Attorney, Agent, or Firm* — Stephen F Wolf; Brittany Nanzig; Grumbles Law, PLLC

(57) ABSTRACT

A method for networking provides a network service for a network. The network service can include the server system maintaining a database that can include information about connections between nodes. The network service can include the server system receiving a potential connection message from a first node to be delivered to a third node. The potential connection message can include a suggestion that the third node connect to a second node. The network service can include the server system delivering the potential connection message to the third node, only if the server system verifies in the database that the first node is connected with the third node and the second node. The network service can include the server system receiving feedback from the third node regarding the second node. The network service can include the server system connecting the second node to the third node, only if the feedback from the third node regarding the second node is positive.

14 Claims, 6 Drawing Sheets

(56) References Cited

U.S. PATENT DOCUMENTS

| | | | |
|---|---|---|---|
| 2008/0253363 A1* | 10/2008 | Altberg | G06Q 30/02 370/352 |
| 2008/0288612 A1* | 11/2008 | Kwon | G06Q 10/00 709/220 |
| 2013/0191416 A1* | 7/2013 | Lee | G06F 17/30979 707/771 |
| 2013/0254213 A1* | 9/2013 | Cheng | G06Q 50/01 707/748 |
| 2014/0020115 A1* | 1/2014 | Le Chevalier | G06F 17/30014 726/28 |
| 2015/0026083 A1* | 1/2015 | Paliwal | G06Q 50/01 705/319 |
| 2015/0106366 A1* | 4/2015 | Stuttle | G06Q 30/0259 707/732 |
| 2016/0180316 A1* | 6/2016 | Wang | G06Q 20/22 705/39 |
| 2016/0212230 A1* | 7/2016 | Schneider | H04L 67/22 |
| 2016/0261544 A1* | 9/2016 | Conover | H04L 51/32 |

* cited by examiner

NETWORK CONNECTION SYSTEM AND METHOD

CROSS-REFERENCE TO RELATED APPLICATION

This application claims the benefit of U.S. Provisional Application No. 62/251,778 filed Nov. 6, 2015 and titled THREE-NODE NETWORK CONNECTION SYSTEM AND APPARATUS, which is hereby incorporated by reference.

TECHNICAL FIELD

The present disclosure relates to networks, and more particularly, to connections between nodes of networks.

BACKGROUND

Generally, nodes connect to each other in a computer network on a two-node at a time connection event basis. For example, friending on Facebook, following a user on Twitter or connecting on LinkedIn involves two nodes in the connection event. Collection of these events and calculations based on the collected data can define a network composed of many two-node events. One use of these networks is to identify nodes currently unconnected in the network that could be connected, for example based on a common connection that both unconnected nodes share. However, as no definitive data is available to confirm these unconnected nodes are actually related or otherwise relevant to each other, the creation of that connection can require an additional connection event, which can be another two-node connection event to confirm that the unconnected nodes should be connected to each other in the network.

This can be seen, as an example, in recommendation engines for products based upon what a person with similar attributes to you has purchased at an online store, such as Amazon, or entertainment watched, such as Netflix. There is considerable value placed upon correct and comprehensive data about what nodes connect to each other within a network by businesses. Netflix, for example, offered a bounty to optimize their algorithm for recommending entertainment choices to their customers based on other customers' potential similarities in collected data of viewing choices, habits and ratings.

This drive to add nodes and build connections between the nodes in a network is also seen with social networks, such as Facebook, Twitter and LinkedIn, in which the social networks present an activity to a user in which additional potential nodes in the network are suggested for you to connect with based on your common connections. The potential value of these networks can be providing user data and attributes to external parties for a fee such as for targeted advertisements. As recently seen in the acquisition of LinkedIn by Microsoft, the network of contacts was seen as a large portion of the value of the transaction.

In view of the value of connections in networking, it would be desirable to provide new methods for facilitating and establishing networking connections.

SUMMARY

The present disclosure provides network systems and methods that can include three-node connection events to build, grow and maintain networks. The use of one active party to directly connect two additional passive parties to each other can add more information to the network on a per event basis than existing two-party connection events currently used. Additional connections can be made by an active party to connect more nodes in the network with a three-node connection event than would be possible in a two-node connection event network if the parties connected by the three-node connection event were not as active in comparison or did not choose to participate in the network by initiating their own connection events. Additionally, collecting feedback about the connections created between the nodes in a three-party connection event can confirm or modify information created in the network by the three-node connection event. Storage and calculation of this feedback can allow for mathematically-defined metrics to define network strength between nodes. These calculated metrics can allow for novel uses of a network including feedback events, in either a three-node or two-node connection network. While a conventional network of connected nodes may be able to find an optimal route based on shortest path distance in hops, a network of the present disclosure with metrics calculated between nodes can use a novel route based on connection strength between nodes which may not be the shortest path, but may have a greater probability of a successful connection for two nodes not directly connected. Systems and methods of the present disclosure can also provide metrics such as a calculated reputation for a connected party or product. This calculated reputation can be based on previously collected feedback from other users connected to the party or product. This calculated reputation can be communicated to users during a connection event such that users have additional information to decide whether to accept a connection. Because the network has provided positive feedback about the event, this can result in a higher likelihood for a person acting upon a proposed or recommended connection compared to an advertisement or targeted marketing received from an unknown person or business. Conversely, a negative reputation can indicate that the person or product being connected is not a priority to act on.

In an illustrative but non-limiting example, the disclosure provides a method for networking that can include utilizing a server system having one or more processors programmed and configured to provide a network service for a network. The network service can include the server system maintaining a database that can include information about connections between nodes. The network service can include the server system receiving a potential connection message from a first node to be delivered to a third node. The potential connection message can include a suggestion that the third node connect to a second node. The network service can include the server system delivering the potential connection message to the third node, only if the server system verifies in the database that the first node is connected with the third node and the second node. The network service can include the server system receiving feedback from the third node regarding the second node. The network service can include the server system connecting the second node to the third node, only if the feedback from the third node regarding the second node is positive.

In some examples, the method can include the first node utilizing a first computing system having one or more processors programmed and configured to generate the potential connection message, and to transmit the potential connection message to the server system.

In some examples, the method can include the second node utilizing a second computing system having one or more processors programmed and configured to generate a request to be connected to the third node, and transmit the request to be connected to the third node to the server system. The request can include requesting that the first node generate the potential connection message.

In some examples, the method can include the second node utilizing a second computing system having one or more processors programmed and configured to generate a request to be connected to the third node, and to transmit the request to be connected to the third node to the server system. The network service provided by the server system can further include the server system receiving the request from the second node to be connected to the third node; the server system selecting, based at least in part upon information in the database, a node of a plurality of nodes to act as the first node; and the server system transmitting the request from the second to be connected to the third node to the first node.

In some examples, the network service provided by the server system can further include the server system receiving feedback from at least one of the first node, the second node, and the third node, the server system storing the feedback in the database. In some such examples, the network service provided by the server system can further include the server system calculating at least one strength of at least one connection between nodes of the network based at least in part upon the feedback; and the server system storing the at least one strength as part of the information about connections between nodes of the database.

In another illustrative but non-limiting example, the disclosure provides a method for networking that can include utilizing a server system having one or more processors programmed and configured to provide a network service for a network. The network service can include the server system maintaining a database that can include information about connections between nodes. The network service can include the server system receiving a request from a first node to be connected to a second node. The network service can include the server system determining at least one potential connection path between the first node and the second node, where the at least one potential connection path can include two or more intermediate nodes. The network service can include the server system communicating the at least one potential connection path to the first node. The network service can include the server system receiving a request from the first node that one of the two or more intermediate nodes send a potential connection message to another of the two or more intermediate nodes, where the potential connection message can include a suggestion that the another of the two or more intermediate nodes connect to the first node, and where the another of the two or more intermediate nodes is connected to the second node.

In some examples, the server system can determine at least one potential connection path that can include consideration of at least one of network statistics and strengths of connections between nodes.

In some examples, the network service provided by the server system can further include the server system receiving feedback from at least one node, and the server system storing the feedback in the database.

In some examples, the network service provided by the server system can further include the server system calculating at least one strength of at least one connection between nodes of the network based at least in part upon the feedback, and the server system storing the at least one strength as part of the information about connections between nodes of the database.

In yet another illustrative but non-limiting example, the disclosure provides a computer-implemented network system that can comprise a computer server system having one or more processors programmed and configured to provide a network service. The network service can include the server system maintaining a database that can include information about connections between nodes. The network service can include the server system receiving a potential connection message from a first node to be delivered to a third node. The potential connection message can include a suggestion that the third node connect to a second node. The network service can include the server system delivering the potential connection message to the third node, only if the server system verifies in the database that the first node is connected with the third node and the second node. The network service can include the server system receiving feedback from the third node regarding the second node. The network service can include the server system connecting the second node to the third node, only if the feedback from the third node regarding the second node is positive.

The above summary is not intended to describe each and every example or every implementation of the disclosure. The Description that follows more particularly exemplifies various illustrative embodiments.

BRIEF DESCRIPTION OF THE FIGURES

The following description should be read with reference to the drawings. The drawings, which are not necessarily to scale, depict examples and are not intended to limit the scope of the disclosure. The disclosure may be more completely understood in consideration of the following description with respect to various examples in connection with the accompanying drawings, in which.

DESCRIPTION

Figure 1:
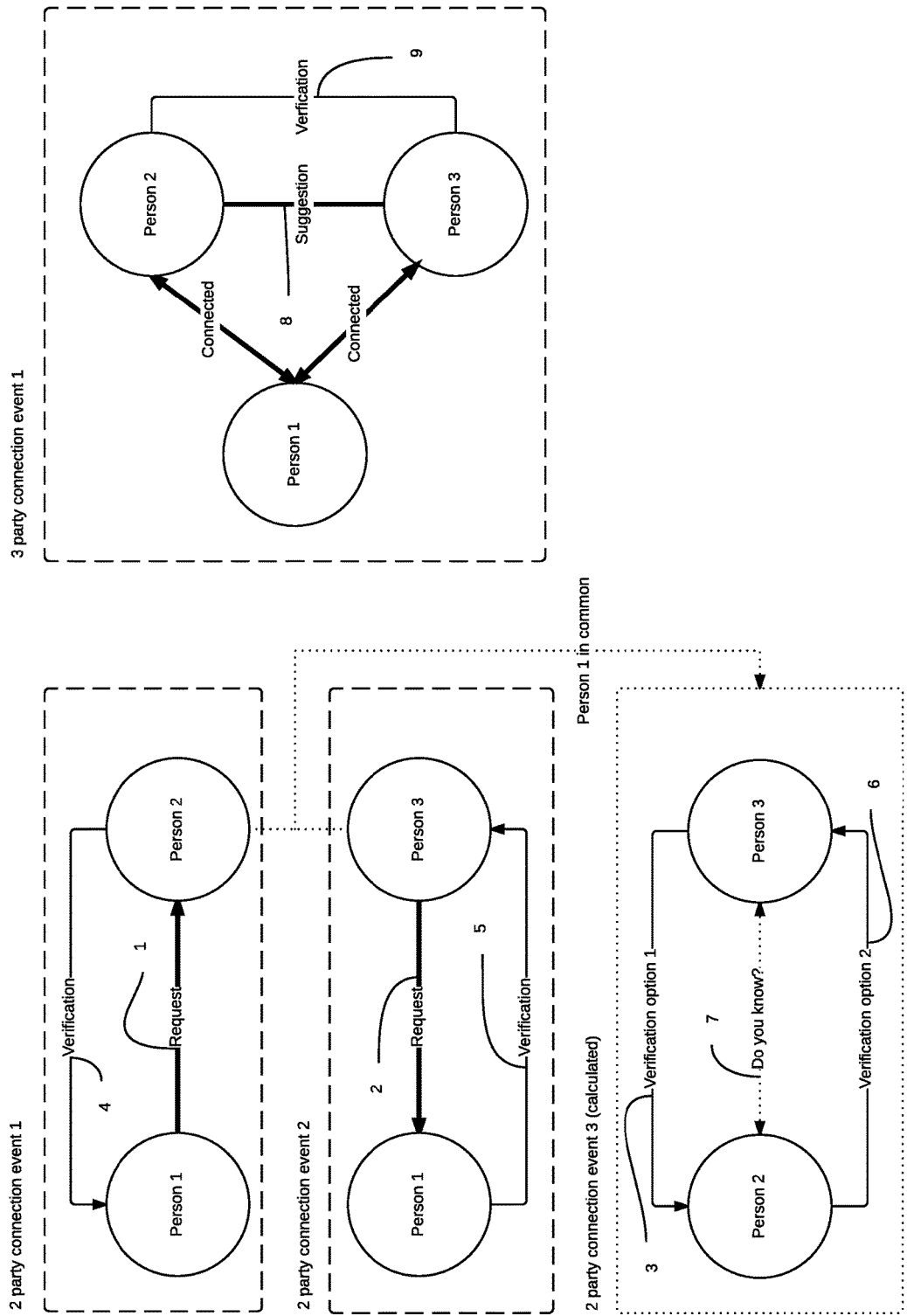
FIG. 1 compares network creation via a two-node connection event to a three-node connection event.

The following description should be read with reference to the drawings, in which like elements in different drawings may be numbered in like fashion. The drawings, which are not necessarily to scale, depict selected examples and are not intended to limit the scope of the disclosure. Although examples of construction, dimensions, and materials may be illustrated for the various elements, those skilled in the art will recognize that many of the examples provided have suitable alternatives that may be utilized.

Definitions

Node or Person—As used in the present disclosure, a node can include an entity such as a person, product and/or organization. A node can include a user account associated with the entity, such as an account on a social network. A node can include hardware associated with the entity in the form of a personal computer, smartphone, portable computing device and/or any other suitable information-enabled hardware devices. A node can include a software application or software instructions usable by the entity to interact with a social network. The software can, in some cases, execute autonomously in accordance with preferences/instructions previously established by/for an entity.

Connection, Connection Data—As used in the present disclosure, a connection is an edge between nodes as per standard graph theory. Connection data is data that contains information about nodes and the edges between the nodes.

Network, Network Connection Event, Network Creation Event—As used in the present disclosure, the network can refer to the graph composed of nodes and edges created by the connections between the nodes. A network connection event is an event that adds information to the network such that a new connection is created or an existing connection is removed, or an existing connection is made stronger or less strong. A network creation event is an event that adds a new connection to the network of nodes.

Potential, Rejected, Verified Connection—As used in the present disclosure, these are described herein.

Strength of Connection, Reputation—As used in the present disclosure, a strength of connection or reputation are synonyms for a calculated metric of the filtered or total connection data between the nodes.

Censoring or banning—As used in the present disclosure, censoring refers to blocking of connection events between nodes, and banning refers to blocking all connection events between a node and the entire network.

Contact information—As used in the present disclosure, contact information refers to a unique destination to deliver information to such as a phone number for SMS, email address for SMTP, social network account for Facebook and other social networks.

Unique Identifier—As used in the present disclosure, a unique identifier refers to a string of letters and numbers that uniquely identify a node in the network even if contact information such as a phone number is reused by a new node.

Spam—In this disclosure, spam refers to unsolicited or unwanted messages from the viewpoint of the receiving node.

In the present disclosure, the following conditional expressions should be understood to agree with conventional formal logic, as summarized thus:

"A if B" means that B is a sufficient (but not necessarily necessary) condition for A. "A if B" can be expressed alternately as "if B, (then) A".

"A only if B" means that B is a necessary (but not necessarily sufficient) condition for A. "A only if B" can be expressed alternately as "only if B, (then) A".

"A if and only if B" means that B is a necessary and sufficient condition for A. "A if and only if B" can be expressed alternately as "if and only if B, (then) A".

Embodiments of the present disclosure provide a method, system and computer program product for enabling a connecting party ("Person One") to connect two parties, or a party and a product or a product to a product, to each other by using Person One's knowledge of the other two parties' contact information. In some examples, the two potentially connected parties ("Person Two" and "Person Three") may not have equal access to information within the connection event. For example, while Person Three may not otherwise be provided with information about Person Two, Person One can share with Person Three any information Person One knows about Person Two. In another example the parties may have equal access to information such that all Parties receive the same information in a connection event. It is to be understood that "persons" in examples of the present disclosure are not necessarily solely limited to human persons and can more generally describe "nodes" as defined herein.

FIG. 1 illustrates both a more conventional two-node connection events (on the left side of FIG. 1) to the novel and non-obvious method of utilizing three parties in a network event of the present disclosure (on the right side of FIG. 1). Considering first more conventional two-node connection events (left side of FIG. 1), to make and confirm a network that links Persons One, Two and Three, a system can require three separate connection events that can include: Requests at 1 and at 2; associated Feedback response actions at 4 and at 5; and a third connection event can include a potential system-mediated Offer at 7 to Person Two and Person Three, which can require either or both of Verifications at 3 and at 6 to finalize.

The right side of FIG. 1 illustrates a novel and non-obvious three-node connection event of the present disclosure that can connect the same three nodes in the network via a single connection event, in which Person One can suggest at 8 that Person Three accept a connection to Person Two. The three-node connection event only requires one feedback response action at 9 to confirm connections between Persons One, Two, and Three or to reject a connection between Persons Two and Three. The disclosed system provides an improvement of network building efficiency for a three-node connection event where three connections can be created compared to two-node connection events in which only one connection can be created at a time.

Figure 2:
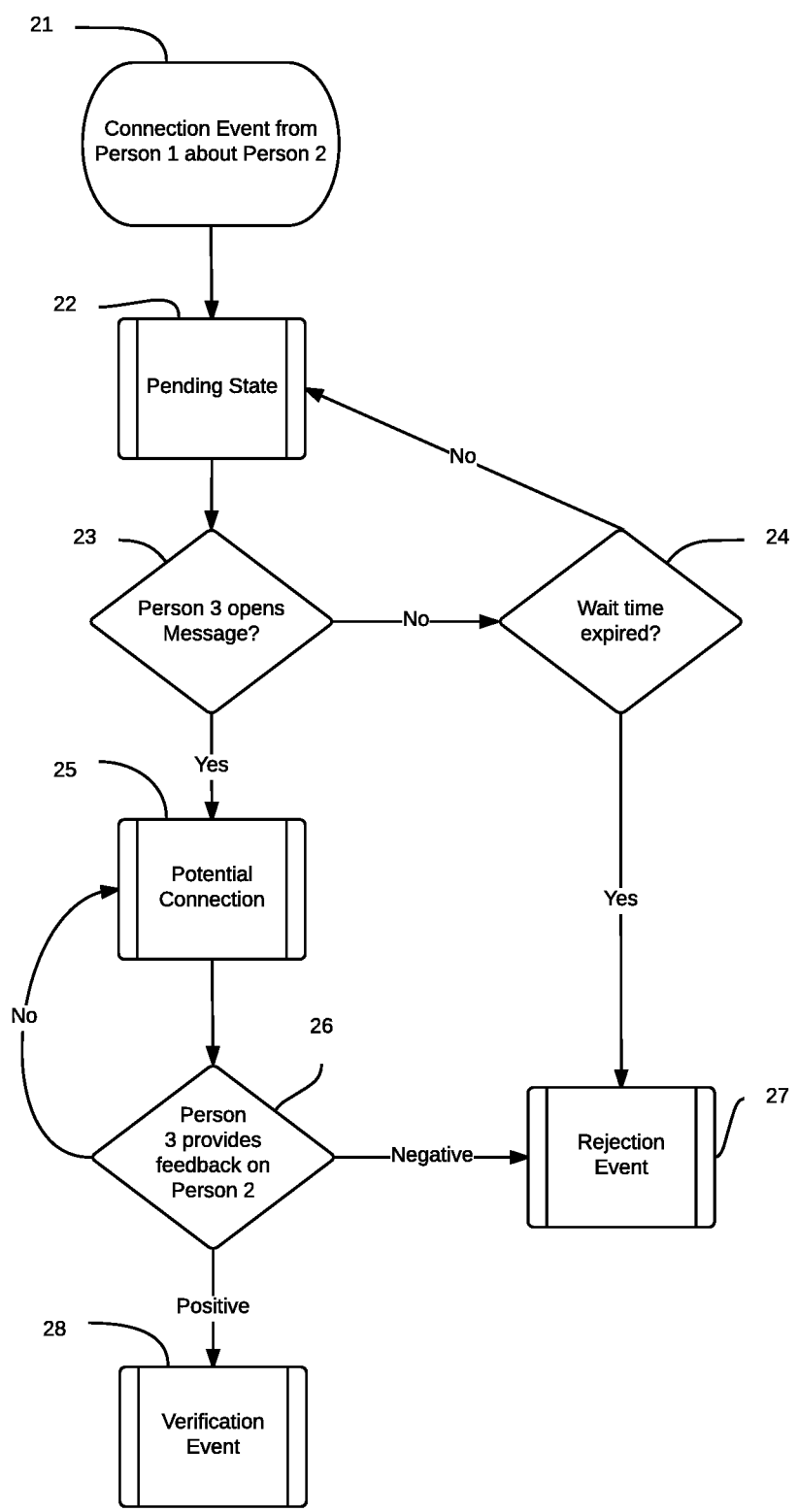
FIG. 2 is a flowchart of possible event states for a three-node connection event.

FIG. 2 illustrates stages that a connection event can proceed through during the lifecycle of a three-node connection event. There can be at least four potential stages of a connection between Person Two and Person Three in a three-node connection event. Person One can initiate a connection event by sending a message at 21 to Person Three about a potential connection to Person Two. The state of the connection event can be pending at 22 until Person Three opens the message. The system can set an expiration time and, if the message is not opened prior to that time, the expiration can be considered to be a rejection event at 24. If the message is opened at 23, the connection event can move into a potential connection stage at 25, wherein a link between Person Two and Person Three can be made in the network with a weak link type. If Person Three does not provide feedback on Person Two, then this connection can remain in the potential connection state until rejected or verified. If Person Three is verified by Person Two at 26, then the connection event can move to the verified state at 28. If Person Two gives negative feedback to Person Three, then the connection event can move to the rejected state at 27.

The three-node connection event of the right side of FIG. 1 and the flow diagram of FIG. 2 can be motivated or initiated in any suitable way, for any suitable reason. For example, Person One may consider it desirable or potentially desirable to connect Persons Two and Three, and thus Person One can take the initiative to initiate the potential connection at 21 of FIG. 2. In another example, Person Two, wishing to be connected to Person Three and having foreknowledge that Person One is a mutual contact, can request that Person One initiate the potential connection at 21. In yet another example, Person Two may wish to be connected to Person Three, but may not be aware that they have a shared contact (Person One). In this example, Person Two may request from the network system of the present disclosure that it identify one or more mutual contacts (such as Person One), such that Person Two may then ask one of said mutual contacts to initial the potential connection with a suggestion to Person Three to connect with Person Two. As discussed later herein in connection with FIG. 5, the network system may also suggest a more complex scheme for connecting two Persons. These are just some examples, and other examples of initiations of three-node connections exist consistent with the scope of the present disclosure.

In some embodiments, the connection data that can be created and collected between two connected parties, Person Two and Person Three by Person One, can be used to generate network connection information. Feedback from Person Two about Person Three to Person One can also be created and collected. The collected connection information and feedback can be used to calculate metrics such as the strengths of connections between nodes, the calculation of all the nodes connected to a user, and the strength of the user within the network of nodes connected to that user. These calculations can be provided to the users of the network as performance data. The connection event made between Person One, the connecting party, and Person Three can be stored by the system. The network connection information can also be updated with feedback generated by the attempted or successful connection of Person Three to Person Two.

Examples of performance data within the network include:
 (1) Person One's number of connections, number of messages accepted, the number of rejections and verified events from the feedback of the destination of the connection event
 (2) Person Two's number of messages, number of messages accepted, the number of rejections and verifications based on the feedback provided to the computer software system
 (3) Person Three's number of times being connected, number of accepted messages containing the user, and the number of rejections and verified events based on the feedback of Person Two.

This performance data can also be used to perform comparisons between multiple nodes performance data in the network. For example, a user could be any or none of these within their network of connected nodes:
 most positive feedback when acting as Person One
 most connections made as Person One
 most connections received as Person Two
 rank of feedback when being connected as Person Three.

Figure 4:
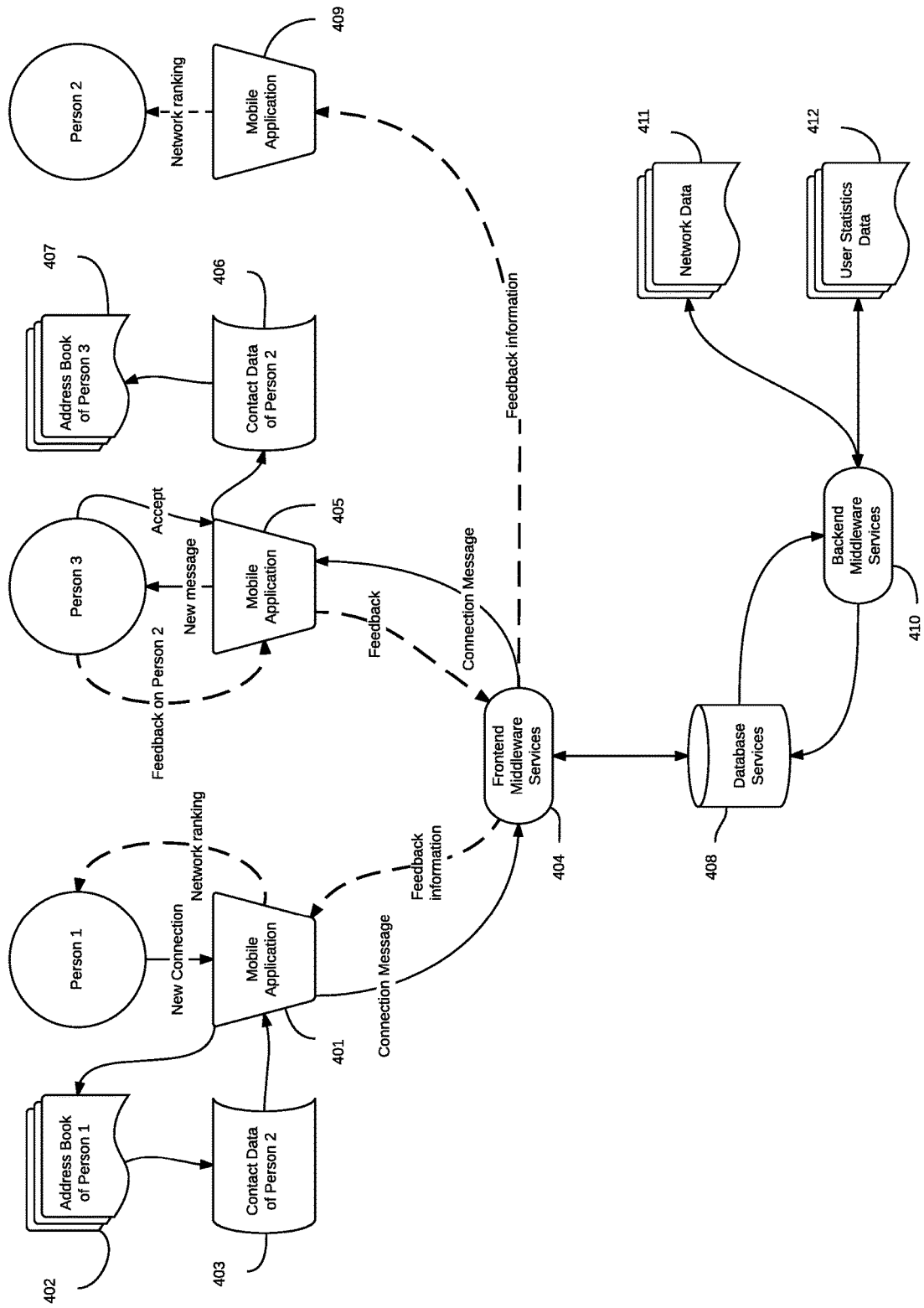
FIG. 4 illustrates an overview of users and systems component interactions during a three-node connection event and feedback collection follow-up.

Data generated from feedback events can be used to exclude those engaging in nuisance activity or falsification of network metrics activity by analysis and processing. For example, as illustrated in FIG. 4, information can be processed using a back end set of middleware servers and applications. Alternatively, individuals directly involved in the connection events can validate data. For example, if a bad connection is made, the connected person in the transaction can correct the connection via feedback. Algorithms that detect bulk spammers based on a high percentage of proposed connection events for which other nodes ignore these proposed connection events and/or continuous negative feedback of the proposed connection events can be used to censor connection events sent by that user to other users that do not give positive feedback to that user. Continued abuse can eventually result in the system censoring a user from the system completely.

Figure 3:
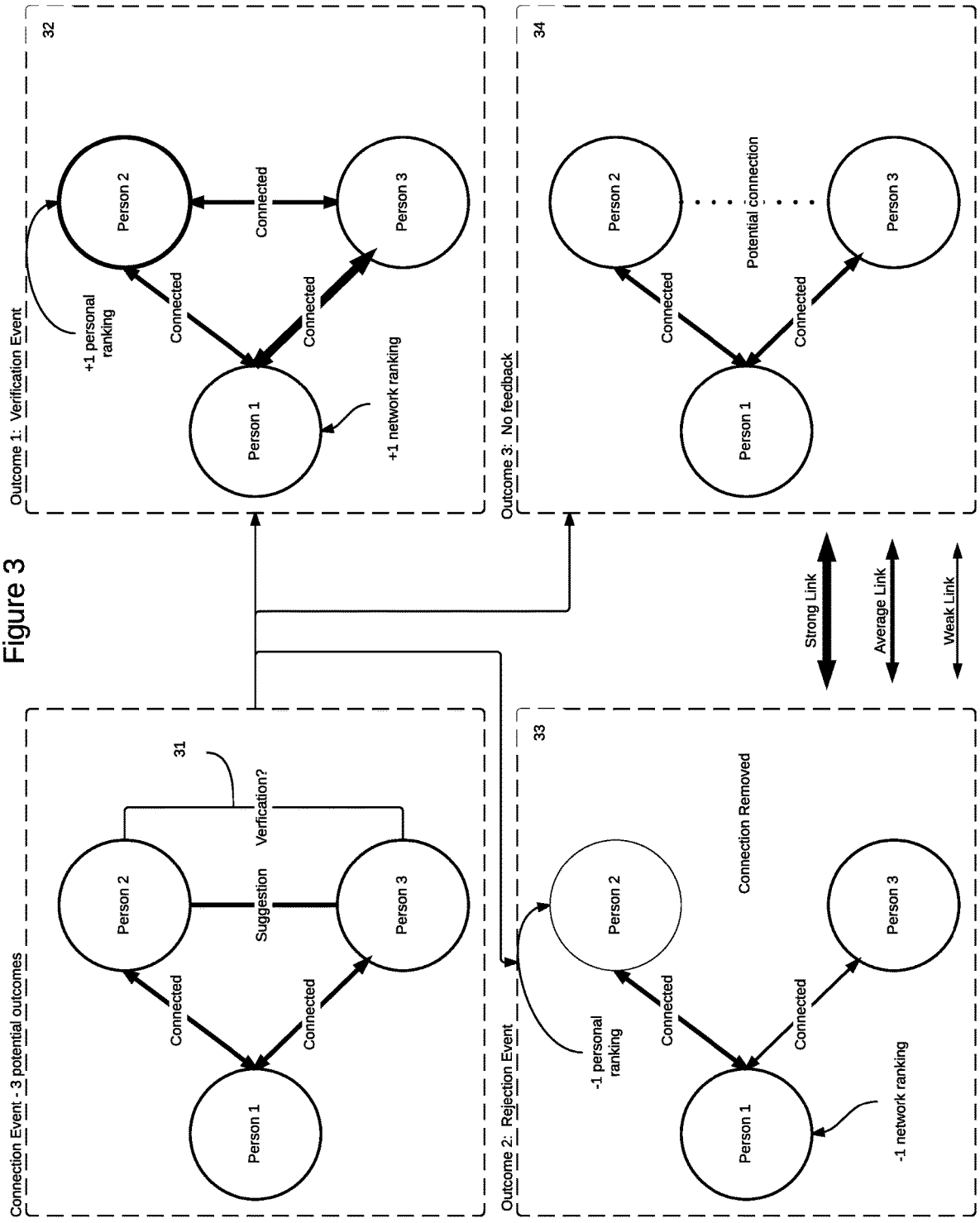
FIG. 3 illustrates three possible network calculation outcomes that can result from a three-node connection event.

FIG. 3 illustrates three possible network calculation outcomes that can result from a three-node connection event. As illustrated in FIG. 3, there can be at least three states of the connection depending on the actions of the Persons participating in the three-node connection event. Three possible network calculation outcomes that can result based on feedback from a three-node connection event at 31 are: verified connection (positive), rejected connection (negative), and no feedback (neutral). The first possible network calculation outcome at 32, that the connection is validated, can strengthen the network and can modify it to indicate Person One has a positive score for that connection (+1 network ranking). Additionally at 32, the personal score of Person Two, who was the connected party to Person Three for that connection, can be increased (+1 personal ranking). As described above, calculations can be based on the states of the connections from a node to other nodes. Calculated metrics can reflect positive and negative feedback in total for the network, as well as information based on individual nodes in the network calculated from their actions and being connected within the network. The second possible network calculation outcome at 33, that the connection is removed by negative feedback, can result in a negative recorded score for Person One for that connection (−1 network ranking) as well as a reduction in the personal ranking of Person Two (−1 personal ranking) who was attempted to be connected to Person Three by Person One for that connection. The third possible network calculation outcome at 34 is that the connection is still pending. This pending status can later result in a negative connection if the network enforces a time limit on connection states. Alternatively, the potential link can remain open indefinitely in the network with neutral feedback for that connection.

In some embodiments, persons that wish to participate in the network can install an application to a mobile device. The application may already contain contact information for other persons, or such contact information may be provided to or otherwise made available to the application in any suitable manner, for example, by importing contact information from a pre-existing contacts database of the mobile device. During connection events, the application can allow the person (i.e., Person One) to select a subset or all of a second person's (i.e., Person Two's) contact information to send to a third person (i.e., Person Three).

The mobile application can search for, and store for later use, a unique identifier for Person Three so that a message about Person Two can be created, transmitted, and stored by the server. The server can run services that enable the mobile application to communicate over a communication network via a REST interface or any other suitable connection protocol such as SOAP. Person Three can be notified of a new message in their mobile device application. Person Two's information can be made available to Person Three. When Person Two's information is utilized, this event can be stored as an accepted state for the information.

If and when Person Three later provides feedback on the connection to Person Two, a positive or negative feedback may be stored as an approved state for the information. Person One and Person Two may receive immediate positive notification. If the feedback is negative, both Person One and Person Two can receive immediate negative notification and the connection between Person Two and Person Three can be removed from the network.

Person Three, if he or she does not yet participate in the network, can be invited to join the network initiated by the actions of Person One. Person Three can be contacted via information that Person One possesses, such as the phone number known by Person One to send an SMS message with instructions to join the network or instructions via email, messages via social networks that the persons already do participate in, such as (but not limited to) Facebook, Twitter or Instagram, during a personal conversation, or by any other suitable method of communication.

FIG. 4 illustrates an overview of components of a system of the present disclosure for the entire lifecycle of a connection event. More specifically, it illustrates an overview of users and system component interactions during a three-node connection event and feedback collection follow-up. This is a high level overview illustrating interactions between users, mobile applications, and front-end and back-end middleware and the database services, as well as information calculated. Communication between entities of FIG. 4 can be performed in any suitable manner or manners, using any suitable data networks, any suitable protocols, and any suitable communication technologies, such as (but not limited to) the internet; cellular data networks; wired, wireless, and/or optical broadband; Wi-Fi; Ethernet; peer-to-peer networking; Bluetooth, Zigbee; security protocols such as SSL and TSL; and so on.

Person One can utilize a mobile application 401 operating on their mobile device. The mobile application can use data from a native or third party contacts database 402 on that mobile device to send a message and contact data/information 403 about Person Two to Person Three. The mobile application 401 can interact with front-end middleware services tier 404 via the internet or other suitable data network to process the message and persist it in the database services tier of the system.

The front-end middleware services tier 404 can deliver (via the internet or other suitable data network) the message to Person Three through a mobile application 405 operating on their mobile device. Person Three then can choose to import the contact data of Person Two 406 from the message into his or her contact database 407. Feedback on Person Two may be collected and sent back through the front-end middleware services tier 404 and be stored in the database services tier 408. The front-end middleware services tier 404 can be operating in a traditional data center, a cloud based infrastructure, or a serverless architecture. The database services tier 408 can be operating in a traditional data center or in a cloud-based infrastructure. The back-end middleware services tier 410 can be operating in a traditional data center, a cloud based infrastructure or a serverless architecture. There is no requirement for these services to be co-located or to be separated within the same server or even data center.

The back-end middleware tier 410 can process data in the database services tier 408 to calculate network metrics 411 as well as user metrics 412 for interactive requests, batch processes and any other type of request. Calculations of metrics of the network based on the connection data for individual users can be performed on a user-by-user basis to efficiently match how data is stored in the database. In one example, utilizing a single document with all information related to a user, the middleware tier 404 can retrieve data from the database 408 for calculation, manipulation and presentation. This can improve system response time by having all data available for read and write operations after a single database lookup for user workflows. As another example, a materialized view of the user can be generated by analyzing transactions involving the user when acting as Person One, when connected as Person Two, or when connected to as Person Three. These user-level metrics can be stored in the user document in database services tier 408 for use by the front-end middleware services 404 or calculated at the time requested by the front or back end middleware tier. Additionally, the front-end middleware services 404 may present these metrics to the mobile devices and may store or cache the results after calculation.

By utilizing a user document storage schema, the system can be easily horizontally scaled and can benefit from increased processing speed, data storage and recall speed. For example, more database servers can be added to scale the system horizontally, since they do not need to perform transactional work across multiple tables, and they do not need to lock access to data being updated by other users. They only lock access to one document at a time.

The mechanism of storing all user data within a user document additionally can allow for system self-healing if data is somehow inconsistent when compared to other copies. For example, connection information for a user to other users can also be stored in all other connected users' documents. A third copy of the data can also be stored as individual connection events: in this case, the non-matching version of data, if incorrect, can be automatically updated by the other two matching versions of the data. This third copy of input data can take advantage of inserting documents into the database, the process of which can be utilized as an audit log for incoming data. This data can then be used to populate the related user documents, storing multiple additional copies of the input data in a fashion that allows horizontal scalability of the input, reads, storage and processing tiers of the back end systems.

Parallel processing of users can be done with algorithms such as map-reduce for calculating user to other users and overall network metrics. Alternatively or in addition, simple parallel processing can be utilized to scale user-centric calculations. Checkpoints can be used during changes to store prior calculation values. This can help minimize the need for recalculation of previously processed data. Checkpoints can utilize a date stamp in the user document to identify new data that is unprocessed. This can help the system process new data that is collected by the actions of users using the system. During data entry events, middleware can attempt to quickly and synchronously update metrics. If user response is impacted by synchronous statistic updates, the system can add a message to a queue for asynchronous processing while addition of processing capacity is catching up to real time events. Random sampling of users and recalculation from the audit log of the data can ensure validity of the system data by validating the current state of the user and the recalculated state matches. Additionally, the system can find the original data and the copies of data stored for related users, and it can recalculate all calculated values, correcting the user information if need be and logging this event in order to validate that the network data is correct or incorrect.

Figure 5:
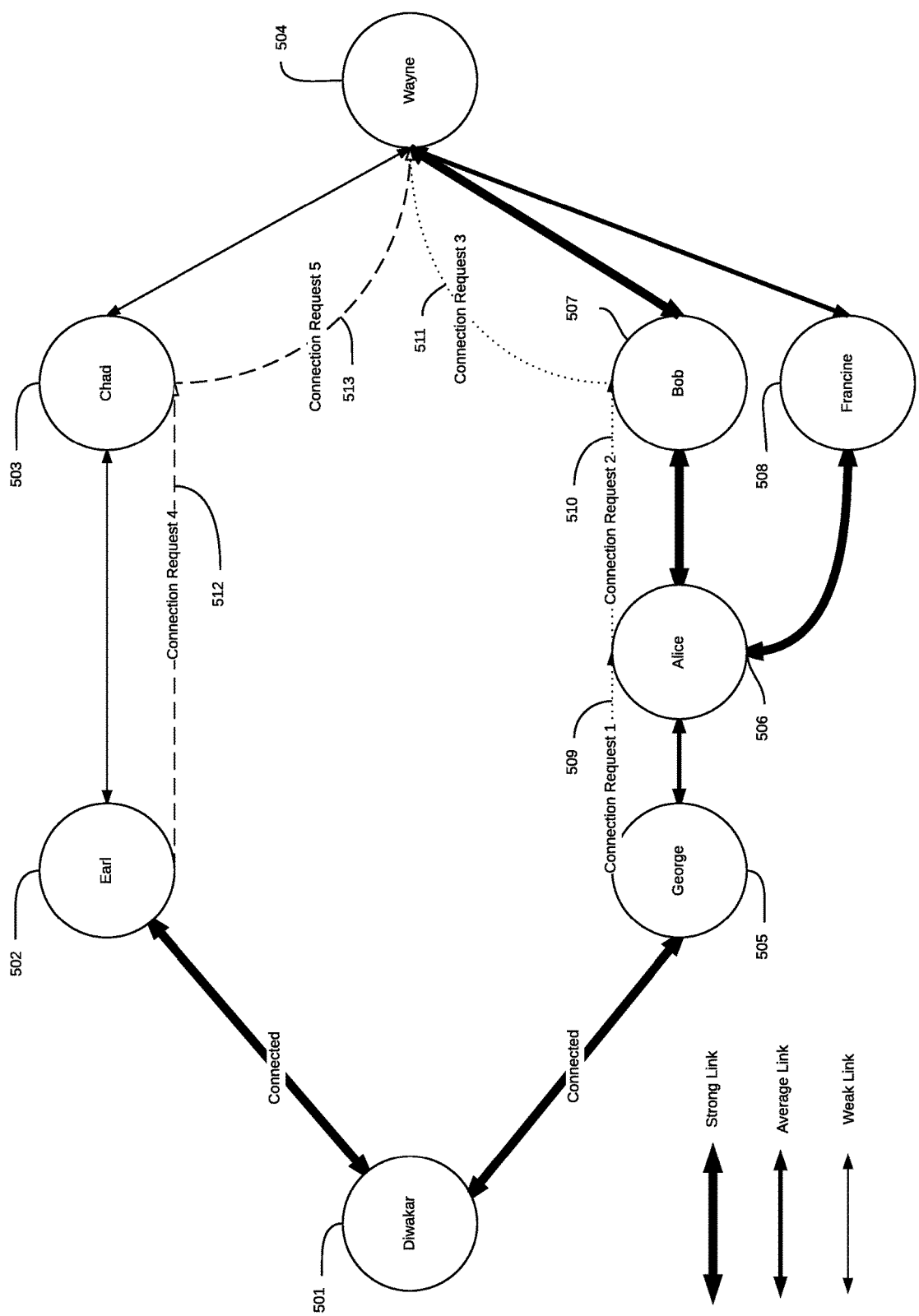
FIG. 5 illustrates how calculated network connections and strength of connections between nodes can determine the most efficient way to connect two nodes.

FIG. 5 illustrates how calculated network connections and strength of connections between nodes can determine more efficient ways to connect two nodes. In this example, the calculated network connections and strength of connections between nodes, along with feedback recorded, indicate that it can be more efficient for Person Two to connect with Person Three via a longer path (i.e., through more people) than via the shortest path in the network, because the shortest path may not have a high probability for success. For example, Diwakar 501 desires to become connected to Wayne 504. While he can attempt to connect with Chad 503 via his existing connection Earl 502 (via a connection request 512 from Earl to Chad suggesting that he connect with Diwakar), and then use a new connection with Chad to request at 513 a connection with Wayne, Chad has a low ranking in the network. This low ranking may be calculated using feedback on Chad's connections and/or his unwillingness to accept connections from others. It may be more beneficial for Diwakar 501 to connect with Wayne 504 by connecting to Alice 506 through his existing connection George 505 (via a connection request 509 from George to Alice suggesting that she connect with Diwakar), and then connecting to Bob 507 (via a connection request 510 from Alice to Bob suggesting that he connect with Diwakar), as George, Alice, and Bob have strong connection rates. While Alice knows both Bob and Francine 508 who connect to Wayne in the network, Bob and Wayne have a stronger connection than Francine and Wayne. Therefore, Diwakar should seek a connection to Wayne via a connection request 511 from Bob to Wayne suggesting a connection to Diwakar, as the network data indicates that Wayne is more likely to accept a connection from Bob than Francine (or Chad). This example assumes Diwakar becomes a trusted connection to each intermediate person in the connection path.

In the example of FIG. 5 (and similarly other connection scenarios), a user such as Diwakar 501 desiring a connection can send a message indicating such desire to the system (for example, to frontend middleware services 404 of FIG. 4). The system, utilizing any appropriate system resources, such as information about the strength of network connections calculated at least in part from metrics, can determine one or more potential connections paths, such as those illustrated in FIG. 5. In some examples, the system can communicate multiple potential connection paths to the user (e.g., Diwakar 501), from which the user can select a potential connection path to attempt to build. In some examples, the system can communicate a single potential connection path to the user, which can be the "best" potential connection path according to defined criteria, which can include, for example, strength of network connections and number of intermediate nodes between the user and the node to which the user desired to be connected.

There are many possible metrics that can be calculated relating to user activity in the networks of the present disclosure. An example of positive metrics collected is: the percentage of accepted messages (such as connection requests/suggestions) that a user has sent, the percentage of messages accepted that a user has received, and the number of times a user has been connected with positive feedback. In addition to positive feedback there are also analogous negative metrics: the percentage of rejected messages that a user has sent, the percentage of messages rejected that a user has received, and the number of times a user has been connected with negative feedback. There is also the possibility of neutral or pending metrics, for example the percentage of no feedback messages that a user has sent, the percentage of messages with no feedback that a user has received, and the number of times that a user has been connected with no feedback. These metrics can be used to calculate network strength in any suitable way. In one example, the metrics can be used to calculate a single metric to model the strength of connections between nodes. In other examples, multiple metrics can be used to characterize a network with positive, negative, and neutral strength connections modeling attractions, repulsions, and connections between nodes. Analysis of metrics can be refined in any suitable way, for example by selecting limiting criteria such as temporal: one week ago until now; ordinal: the last ten events; geospatial: events within 50 miles; content: events with metadata business or personal.

Differentiation between strongly and weakly connected nodes can be better modeled by the metrics collected by three-node connection systems of the present disclosure, as compared to conventional two-node connection systems. A deficiency of known two-node connection systems can be the lack of additional primary data to indicate activity past the initial connection event. It is not possible to determine the strength of a connection within a two-node connection system based solely on connection activity when two-node connection event networks collect only the initial and singular connection event. Once this connection event is complete, there are no additional connection events to indicate that these connected nodes interact without collection of non-connection event activities, such as interacting via a tracking view of user-generated content such as a status update or engaging in discussion via comment systems. In contrast, three-node connection event systems of the present disclosure can continue to collect connection information even with previously connected nodes via connection events as they share nodes, receive nodes, or are shared as a node. This collection of data can allow the system to determine information about connections between nodes based on the connection data. Examples of such connection information can include (but are not limited to) which connections are most frequently used, which are infrequently used, and which only a single connection event has linked together.

Another deficiency of known two-node connection event networks is that there is no temporal dimension that can be used for determination of the connection strength between nodes other than the initial connection event. An improvement of systems and methods of the present disclosure is to use the network to find optimal connections to not directly connected nodes, as illustrated in FIG. 5 and discussed herein. Non-connection event data in known two-node connection event networks may not provide relevant inputs to the calculation of the optimal route based on current network connection activity. For example, two nodes with strong current activity in exchanging messages may suggest, by a count of the number of messages exchanged, a strong connection. But without feedback collected to use in the calculations of the connection strength between these nodes, the activity of exchanging messages could incorrectly predict that these nodes are currently positively connected. In this example, nodes could be engaging in hostile dialogue via a comment system and therefore will be a poor choice to attempt to utilize for a connection event involving another user. A three-node connection event network allows for collection of additional connection events involving already connected nodes with new nodes enabling a temporal calculation of when nodes are actively involved in connection activity and collection of feedback to further confirm or correct these connection events.

Numbered embodiments of the present disclosure include:

1. A method by a computer system for collecting node connection events involving three persons per connection event and feedback later collected about the connection event comprising:
   A. computer software system to process three-node connection events using a data processing and data storage system;
   B. a computer software system to collect feedback on the connection event utilizing a data processing and data storage system;
   C. a computer software system to calculate the network and user statistics based on connection events and feedback data using a data processing and data storage system.

2. The method of embodiment 1, further comprising in which a connection event may change between states based on user actions by using the computer software system in which the change in a state of a connection event changes the calculated state of the network connections.

3. The method of embodiment 2, further comprising in which the feedback from users changes the calculated state of network connections.

4. The method of embodiment 3, further comprising in which collected feedback is used as data in calculations about network connection strength between nodes and node statistics. These calculated values are reported to users of the computer software system.

5. The method of embodiment 4, further comprising in which calculations of network connections, network strength and network statistics may be utilized for searching for a path to connect between nodes not directly connected by users of the computer software system.

6. The method of embodiment 1 implemented as a mobile application to be used by end users of the system. Front-end middleware to provide services to the mobile application such that the data is persisted in a database system and this collected data made available to other users via the front-end middleware system. A back-end middleware system to use the database system to calculate the network and strength of connections between nodes within the network, and the statistics for users of the network that indicate their relative rank in the network based upon feedback of other users.

7. The method of embodiment 1 implemented as a web browser based application to be used by end users of the system. Front-end middleware to provide services to the mobile application such that the data is persisted in a database system and this collected data made available to other users via the front-end middleware system. A back-end middleware system to use the database system to calculate the network and strength of connections between nodes within the network, and the statistics for users of the network that indicate their relative rank in the network based upon feedback of other users.

8. The method of embodiment 1 implemented as a hybrid system where both mobile applications and web browser based applications can be used by end users of the system. Front-end middleware to provide services to the mobile application such that the data is persisted in a database system and this collected data made available to other users via the front-end middleware system. A back-end middleware system to use the database system to calculate the network and strength of connections between nodes within the network, and the statistics for users of the network that indicate their relative rank in the network based upon feedback of other users.

Figure 6:
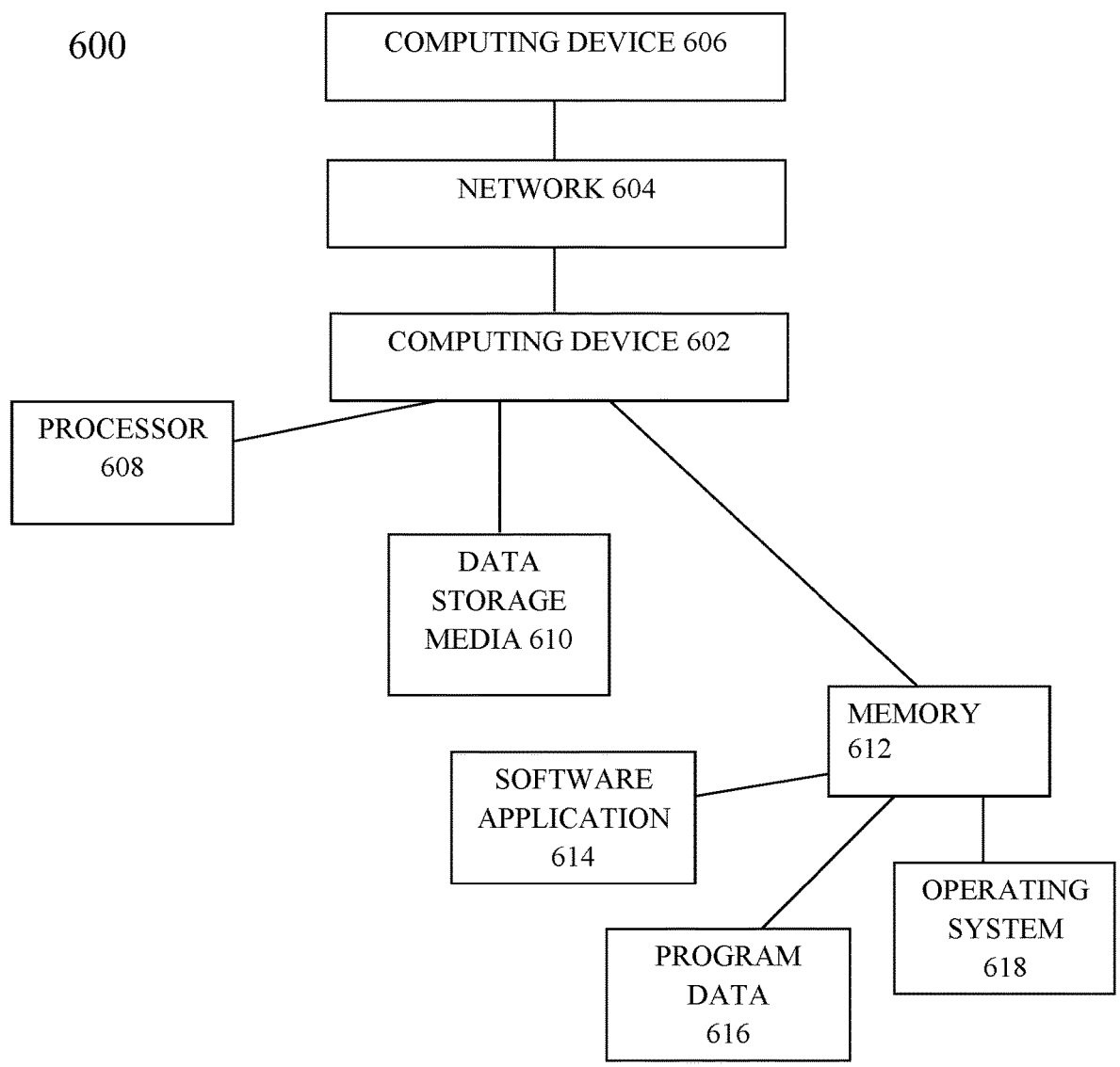
FIG. 6 is a schematic block diagram of an example computing system.

The disclosed system and method involves technology that uses computing systems. FIG. 6 is a schematic block diagram of a non-limiting example computing system 600. The systems of the present disclosure include at least one computing device 602. In some embodiments the computing system further includes a communication network 604 and one or more additional computing devices 606 (such as a server).

Computing device 602 can be, for example, located in a place of business or can be a computing device located in a user's home or office. In some embodiments, computing device 602 is a mobile device. Computing device 602 can be a stand-alone computing device or a networked computing device that communicates with one or more other computing devices 606 across a network 604. The additional computing device(s) 606 can be, for example, located remotely from the first computing device 602, but configured for data communication with the first computing device 602 across a network 604.

In some examples, the computing devices 602 and 606 include at least one processor or processing unit 608 and system memory 612. The processor 608 is a device configured to process a set of instructions. In some embodiments, system memory 612 may be a component of processor 608; in other embodiments system memory is separate from the processor. Depending on the exact configuration and type of computing device, the system memory 612 may be volatile (such as RAM), non-volatile (such as ROM, flash memory, etc.) or some combination of the two. System memory 612 typically includes an operating system 618 suitable for controlling the operation of the computing device, such as the Linux operating system. The system memory 612 may also include one or more software applications 614 and may include program data 616.

The computing device may have additional features or functionality. For example, the device may also include additional data storage devices 610 (removable and/or non-removable) such as, for example, magnetic disks, optical disks, or tape. Computer storage media 610 may include volatile and nonvolatile, removable and non-removable media implemented in any method or technology for storage of information, such as computer readable instructions, data structures, program modules, or other data. System memory, removable storage, and non-removable storage are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device. An example of computer storage media is non-transitory media.

In some examples, one or more of the computing devices 602, 606 can be located in a place of business. In other examples, the computing device can be a personal computing device that is networked to allow the user to access aspects of the present innovation at a remote location, such as in a user's home, office or other location. In some embodiments, the computing device 602 is a smart phone, tablet, laptop computer, personal digital assistant, or other mobile computing device. In some embodiments, aspects of the innovation are stored as data instructions for a smart phone application. A network 604 facilitates communication between the computing device 602 and one or more servers, such as an additional computing device 606, that host the system. The network 604 may be a wide variety of different types of electronic communication networks. For example, the network may be a wide-area network, such as the Internet, a local-area network, a metropolitan-area network, or another type of electronic communication network. The network may include wired and/or wireless data links. A variety of communications protocols may be used in the network including, but not limited to, Wi-Fi, Ethernet, Transport Control Protocol (TCP), Internet Protocol (IP), Hypertext Transfer Protocol (HTTP), SOAP, remote procedure call protocols, and/or other types of communications protocols.

In some examples, the additional computing device 606 is a Web server. In this example, the first computing device 602 includes a Web browser that communicates with the Web server to request and retrieve data. The data is then displayed to the user, such as by using a Web browser software application. In some embodiments, the various operations, methods, and rules disclosed herein are implemented by instructions stored in memory. When the instructions are executed by the processor of one or more of the computing devices 602 and 606, the instructions cause the processor to perform one or more of the operations or methods disclosed herein.

Persons of ordinary skill in arts relevant to this disclosure and subject matter hereof will recognize that embodiments may comprise fewer features than illustrated in any individual embodiment described by example or otherwise contemplated herein. Embodiments described herein are not meant to be an exhaustive presentation of ways in which various features may be combined and/or arranged. Accordingly, the embodiments are not mutually exclusive combinations of features; rather, embodiments can comprise a combination of different individual features selected from different individual embodiments, as understood by persons of ordinary skill in the relevant arts. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of Section 112, sixth paragraph of 35 U.S.C. are not to be invoked unless the specific terms "means for" or "step for" are recited in a claim.

What is claimed is:

1. A method of directly connecting a first network node to a third network node, the method comprising:
providing a server system having a potential connection message from the first network node to the third network node,
wherein the connection message includes a suggestion that the third network node connect to a second network node;
creating and collecting connection data between the second network node and the third network node in a database,
wherein the first network node has a relationship with the second network node and the first network node has a relationship with the third network node;
the first network node delivering the potential connection message to the third network node to form a weak link connection between the third network node and the second network node; and
moving the weak link connection to a strong link connection when the potential connection between the third network node and the second network node is verified by the second network node.

2. A method according to claim 1, wherein the first network node utilizes a first computing system, the first computing system having one or more processors configured to generate the connection message and to transmit the connection message to the server system.

3. A method according to claim 1, further comprising:
the server system receiving the suggestion from the second network node to connect to the third network node;
the server system selecting, based upon the connection data, a node of a plurality of nodes to act as the first network node; and
the server system transmitting the suggestion from the second network node to be connected to the third network node.

4. A method according to claim 1, further comprising:
the server system receiving feedback from at least one of the first network node, the second network node, and the third network node; and
the server system storing the feedback in the database.

5. A method according to claim 4, further comprising:
the server system calculating at least one strength of at least one connection between nodes of the network based upon the feedback stored in the database; and
the server system storing the at least one strength as part of the information about connections between nodes in the database.

6. A method according to claim 5, further comprising the server system calculating at least one strength of at least one connection between nodes of the network based at least in part upon the feedback based upon temporal criteria.

7. A method according to claim 5, further comprising the server system calculating at least one strength of at least one connection between nodes of the network based at least in part upon the feedback based upon geospatial criteria.

8. A system comprising:
a computer server system having one or more processors programmed and configured to provide a server system having a potential connection message from a first network node to a third network node,
wherein the connection message includes a suggestion that the third network node connect to a second network node;
connection data between the second network node and the third network node in a database,
wherein the first network node has a relationship with the second network node and the first network node has a relationship with the third network node stored in the database,
wherein the first network node delivers the potential connection message to the third network node to form a weak link connection between the third network node and the second network node, and
wherein the weak link connection is moved to a strong link connection when the potential connection between the third network node and the second network node is verified by the second network node;
a strong link connection between the second network node and the third network node formed when the connection data from the second network node is verified regarding connection with the third network node; and
a request to be connected to the third network node generated prior to the server system receiving the potential connection message from the first connection node to the third network node,
wherein the request to be connected to the third node of the server system is transmitted prior to the server system receiving the potential connection message from the first connection node to the third network node.

9. A system according to claim 8 wherein the first network node utilizes a first computing system, the first computing system having one or more processors configured to generate the connection message and to transmit the connection message to the server system.

10. A system according to claim 8,
wherein the server system receives the suggestion from the second network node to connect to the third network node,
wherein the server system selects, based upon the connection data, a node of a plurality of nodes to act as the first network node, and
wherein the server system transmits the suggestion from the second network node to be connected to the third network node.

11. A system according to claim 8,
wherein the server system receives feedback from at least one of the first network node, the second network node, and the third network node, and
wherein the server system stores the feedback in the database.

12. A system according to claim 11,
wherein the server system calculates at least one strength of at least one connection between nodes of the network based upon the feedback stored in the database, and
wherein the server system stories the at least one strength as part of the information about connections between nodes in the database.

13. A system according to claim 12, wherein the server system calculates at least one strength of at least one connection between nodes of the network based at least in part upon the feedback based upon temporal criteria.

14. A method according to claim 10, wherein the server system calculates at least one strength of at least one connection between nodes of the network based at least in part upon the feedback based upon geospatial criteria.

* * * * *